United States Patent [19]

Williams

[11] Patent Number: 5,709,103
[45] Date of Patent: Jan. 20, 1998

[54] ELECTRICALLY POWERED DIFFERENTIAL AIR-CYCLE AIR CONDITIONING MACHINE

[75] Inventor: Kenneth Roy Williams, Huntington Beach, Calif.

[73] Assignee: McDonnell Douglas Coporation, Huntington Beach, Calif.

[21] Appl. No.: 689,894

[22] Filed: Aug. 15, 1996

[51] Int. Cl.$^6$ ............................................. F25D 9/00
[52] U.S. Cl. ...................... 62/402; 244/118.5; 310/112
[58] Field of Search ......................... 62/401, 402, 403; 244/118.5; 310/112, 114

[56] References Cited

U.S. PATENT DOCUMENTS

| | | | |
|---|---|---|---|
| 2,960,825 | 11/1960 | Sampietro | 60/39.6 |
| 3,105,631 | 10/1963 | Hänny | 62/402 X |
| 3,194,026 | 7/1965 | LaFleur | 62/402 X |
| 3,321,930 | 5/1967 | LaFleur | 62/402 X |
| 4,312,191 | 1/1982 | Biagnini | 62/402 |
| 4,419,926 | 12/1983 | Cronin et al. | 237/11 X |
| 4,434,624 | 3/1984 | Cronin et al. | 62/402 X |
| 4,462,561 | 7/1984 | Cronin | 244/118.5 |
| 4,523,517 | 6/1985 | Cronin | 237/2 A X |
| 4,684,081 | 8/1987 | Cronin | 244/118.5 X |
| 4,694,654 | 9/1987 | Kawamura | 60/605 |
| 4,706,908 | 11/1987 | Huffman et al. | 244/118.5 |
| 5,150,585 | 9/1992 | Markiewicz | 62/402 X |
| 5,309,029 | 5/1994 | Gregory | 290/1 R |
| 5,535,601 | 7/1996 | Teraoka | 62/402 |

*Primary Examiner*—Christopher Kilner
*Attorney, Agent, or Firm*—The Bell Seltzer Intellectual Property Law Group Of Alston & Bird LLP

[57] ABSTRACT

A digital computer controlled air-cycle air conditioning machine for aircraft contains an electrically powered compressor that turns independently of expansion turbine rotation. An electrical generator coupled to the expansion turbine creates additional electrical power during the air expansion portion of the refrigeration cycle. Under control of the computer, that additional electrical power is returned to the electrical supply for re-use with the compressor. The compressor and turbine are manufactured as a unitary assembly. The generator's field windings rotate with the turbine and the generator's armature rotates with the compressor shaft. Voltages generated in the generator's field winding are thereby dependent on the differential speed between turbine and compressor.

10 Claims, 1 Drawing Sheet

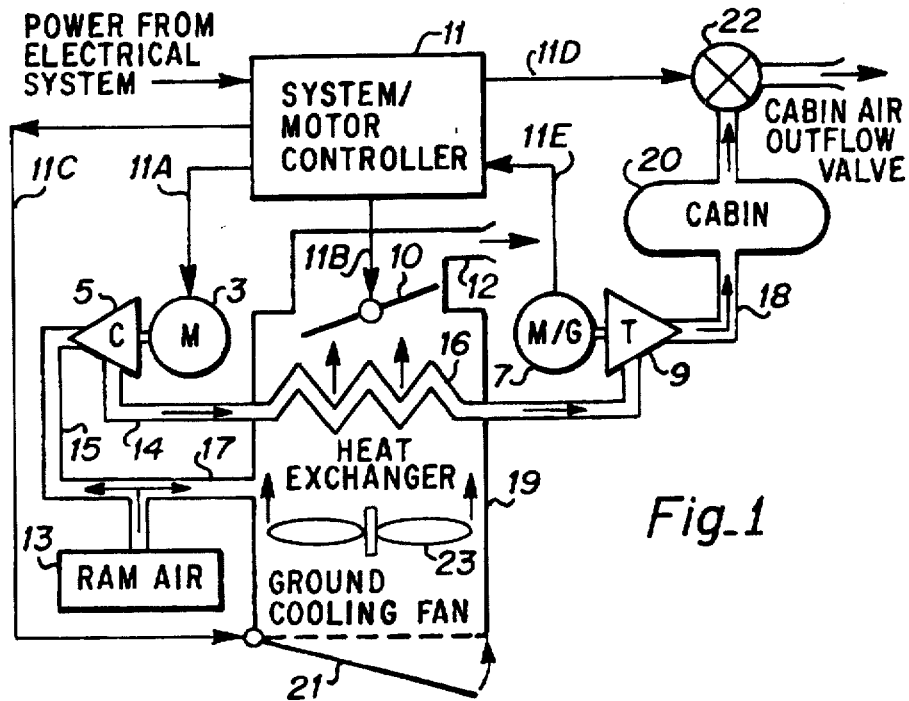
Fig_1
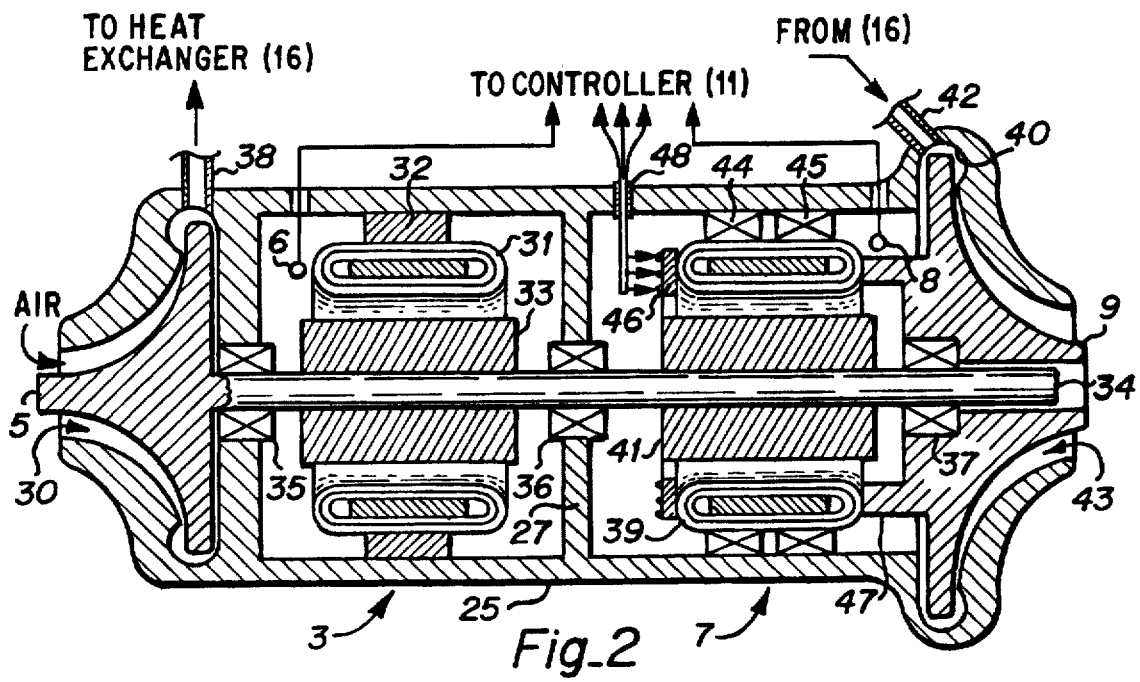
Fig_2

ELECTRICALLY POWERED DIFFERENTIAL AIR-CYCLE AIR CONDITIONING MACHINE

FIELD OF THE INVENTION

This invention relates to aircraft air conditioning equipment, and, more particularly, to an electrically powered aircraft air cooling machine that does not require an engine air bleed.

BACKGROUND

Aircraft air conditioning equipment must be light weight, economical and reliable. Two air cooling systems that fulfil that criteria are presently used in aircraft: an engine bleed air driven compressor and turbine cycle cooling machine, incorporating a ram air intercooler; and a vapor cycle machine, which uses a fluid transport loop. The latter system, like the land based window air conditioners, relies upon a closed recurrent cooling cycle in which the coolant fluid, a refrigerant, undergoes an evaporation step to withdraw heat followed by a condensation step to discharge the acquired heat at the end of the cooling cycle.

A typical engine bleed air driven compressor and turbine cycle cooling machine is supplied with hot pressurized air bled from the aircraft engine. That air is pressure regulated, flow regulated and pre-cooled in a primary heat exchanger and fed to an air compressor which raises its temperature and pressure. The air is cooled in a secondary heat exchanger. From that point the air may be routed through many optional paths before being fed to an expansion turbine where the air is cooled by doing work on the turbine. The most direct route is to the expansion turbine. The more circuitous route allows pre-cooling and moisture adjustment of air prior to entry to the turbine. Energy extracted from the engine bleed airstream is the only motive power for the air conditioning process. That air drives the compressor as well as the expansion turbine. The foregoing arrangement has proven to be very light in weight, reasonably economical to manufacture and reasonably reliable.

In that system the turbine wheels or fans are mounted on the same shaft as the compressor wheel or blade. This allows the energy released against the turbine wheels by expansion of the compressed air to be reinvested or "fed back" to the compressor. The foregoing imposes a limitation. The power output from the turbine must exceed the power absorption of the compressor by at least the amount of the inherent mechanical losses and the thermodynamic discharge.

The "interstage pressure" and corresponding heat rejection is somewhat fixed to the shaft speed and overall flow rate, since the compressor and turbines are forced to operate at the same shaft speed because of the common shaft. Because of that, in order to obtain the desired machine discharge air temperature and air pressure at the required flow rate, the flow paths, attendant valving and heat exchanger arrangements are somewhat complex.

The entire cycle is driven by bleed air from the main engine or APU. Bleed air from the main engine is costly in more than one way. First, when the air is bled from the engine, the flow through the engine compressor is greater than through the engine turbine, resulting in non-optimum operation. Secondly, the condition of the bleed air extracted from the engine is often too high in temperature for use in the air-cycle and is required to first be pre-cooled by ram air, cool air scooped into the aircraft from the aircraft's exterior when flying at high velocity and altitude. This action results in wasted thermal energy from the air stream. Also, the bleed air stream is regulated by throttling which also wastes energy.

An object of the present invention therefore is to provide a new high efficiency aircraft electrical air conditioning system that does not require an engine air bleed, but can use air from the aircraft's exterior and air recirculated from the aircraft's cabin. It is another object of the invention to provide a new air conditioning machine which increases cooling efficiency by permitting energy released at the expansion turbine to be fed back and used for the air compressor.

The prior systems are recognized as being complex in implementation within passenger aircraft, which adds to the cost of manufacture and maintenance. It is therefore a further object of the invention to provide an aircraft air conditioning machine of lesser structural complexity.

Applicant has been made aware of a prior patent that addressed very similar concerns and objects to the foregoing, presented in U.S. Pat. No. 4,312,191, entitled Environmental Control System for Aircraft with Improved Efficiency, granted Jan. 26, 1982 to Guido Biagini and assigned to a large company. That described system employs a concentric arrangement of an externally powered compressor, the power compressor, and a bootstrap compressor/turbine wheel driven by the airstream produced by that power compressor. The compressor and expansion turbine for the air cycle cooling in Biagini's system are located on a wheel in common and thus both at all times rotate at the same relative speed. Due to the fact that the power compressor must over-pressurize the supply air to the air cycle wheel in order to achieve significant cooling, Biagini's system appears somewhat inefficient.

An ancillary object of the invention, is to allow the compressor and turbine to rotate at different relative speeds, permitting control of each of the power input to the compressor, the overall flow rate, and the cooling effect achieved.

SUMMARY

In accordance with the foregoing, the invention is characterized by a digital computer controlled air-cycle air conditioning machine for aircraft that contains an electrically powered compressor which turns independently of the expansion turbine. An electrical generator coupled to the expansion turbine creates a variable torque and speed relation ship between the turbine shaft and compressor shaft during the expansion portion of the refrigeration cycle. Under control of the computer, that additional torque power may be returned to the compressor. Alternatively, the computer can force the generator to function as a motor to assist the compressor and/or vary the pressure rise between compressor and turbine.

The compressor and turbine are manufactured as a unitary assembly. In that unitary assembly the generator's field windings rotate with the turbine and the generator's armature rotates with the compressor shaft. Voltages generated in the generator's field winding are thereby dependent on the differential speed between turbine and compressor and the field excitation. Alternately, the generator can be energized to operate as a motor and assist the compressor.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 is a schematic drawing of an embodiment of the invention; and

FIG. 2 is a pictorial section view of a novel integrated compressor and generator apparatus used in FIG. 1.

DETAILED DESCRIPTION OF THE PREFERRED EMBODIMENTS

Reference is made to FIG. 1 which schematically illustrates an embodiment of the electrically powered differential air-cycle air conditioning machine. The machine includes an electrical air compressor 3 that contains and drives a compressor blade 5, an electromagnetic motor generator apparatus 7, containing an expansion turbine blade 9, and an electrical system and motor controller 11. The aircraft's electrical power supply system, not illustrated, serves as the source of DC current for the controller.

Controller 11 includes electronic switches and a programmed digital electronic processor or computer, as variously termed, and contains inputs for receiving information from various sensors and supplying those inputs to the computer for processing and outputs for controlling the electronic switches in accordance with the sensor inputs processed in accordance with the computer program. The controller thus includes an output 11A for supplying DC current to compressor 3, output 11B for supplying operating current to a plenum valve 10, output 11C for controlling the ground air plenum 21 and an output 11D for controlling cabin air outflow valve 22. The controller contains additional inputs and outputs which are not included in this figure, but will be discussed in connection with FIG. 2. The functions served by the computer become evident from the description of the remaining elements and the operation of the system hereinafter described.

With continued reference to FIG. 1, at an inlet, compressor 3 receives ram air via conduit 15 from source 13 and in operation the compressor blade 5 draws in and compresses that air, raising its temperature and pressure. The higher enthalpy air is expressed through the compressors outlet and from the outlet end, additional plumbing 14 routes compressed air through a heat exchanger 16 and to the inlet side of turbine 9. The air which is cooled in the heat exchanger 16, and is expanded by driving the turbine 9 is thereby further cooled. From the outlet end of turbine 9 the lower pressure cooled air is carried by conduit 18 and introduced into the passenger cabin 20, generally illustrated symbolically. An electrically operated cabin air outflow valve 22, which is controlled by controller 11, meters the evacuation of a controlled amount of air to the exterior of the aircraft, exhausting stale air.

Ram air source 13 connects to the inlet of compressor 5 and a cooling chamber 19 via respective plumbing or conduit 15 and bypass conduit 17, respectively, to supply the cold outside ram air to both locations. As is conventional ram air is obtained by an air scoop, not illustrated, located at the side of the aircraft. A power operated door 21, controlled by controller 11, opens the air scoop to the exterior while the aircraft is not in flight. At the altitudes flown, the outside air, typically, is very cold. At the high flight velocity at which the aircraft travels, that air is driven or rams into the air scoop at a high velocity.

When, however, the aircraft is parked or is taxiing on the runway, ram air is ineffective. Instead, a ground air source is used. A ground air plenum door 21 is opened and the ground cooling fan 23 is operated, receiving operating current from controller 11. The fan draws ambient air in from the outside and forces that air against a heat exchanger 16, which cools the fluid passing through the conduit. Expended cooling air exits from the outlet conduit 12 to the exterior, when, at the direction of controller 11, electrically operated air plenum door 10 opens.

As is apparent, the foregoing system uses the same thermodynamic process found in conventional aircraft air cycle machines. Air is compressed, raising its temperature and pressure, increasing its enthalpy. That heat is then discharged in the ram-air heat exchanger, which cools the air, leaving the air at the same essential pressure but at a lower temperature. Leaving the heat exchanger, the cooled pressurized air is expanded at the expansion turbine. The force of that air expansion exerts the force to rotate the turbine and, thereby, performs work. That expansion has the effect of absorbing heat, and creates a cooling effect on the air. The latter cooled air is then used in the aircraft's cabin.

However, the air supply used in the novel system is not the pressurized higher temperature engine bleed air, but is the cooler ambient air taken from the aircraft's exterior. Electrical power is used to drive the compressor, not bleed air. Moreover, unlike the conventional air cycle system, the turbine is not formed on a common shaft with the compressor. It is located on a separate shaft and each may thereby rotate at its most efficient RPM speed. As a benefit power from the expanding air stream may be indirectly resupplied back into the compressor by means of an electrical generator that is coupled to the turbine. The electrical generator converts the turbines rotation into shaft torque which is used to reduce the electricity driving the electrically powered compressor or provide some portion of that power, thereby enhancing the process efficiency.

The turbine operated generator used in the system of FIG. 1 is structurally integrated with the air compressor in one housing to form a novel manufacture. It is a differential generator; that is, the voltages generated in the generator's field windings is dependent upon the relative rotational speeds between the air compressor and the turbine blade. As illustrated in FIG. 2 the unitary structure includes the DC electric motor driven compressor 3 and a motor controlled expansion turbine 7 integrated together within a single package or metal housing 25. The housing contains an internal annular wall 27 that divides the internal region into two compartments for the respective compressor and expansion turbine. To the left, the housing defines an air compression chamber 30 defined by the walls surrounding compressor blade 5.

Compressor 3 includes the electrical field windings 31, supported by annular bracket 32 in stationary position by the housing wall, and an armature 41, that is mounted to shaft 34, formed suitably by permanent magnets in spaced circumferential positions about the shaft. Shaft 34 extends axially through the length of the housing. The shaft is supported by bearings 35 in the compression chamber's rear wall and bearing 36 in annular wall 27, leaving a portion of the shaft to the right of wall 27 free, that is, is not directly supported.

As is conventional field windings 31 define multiple electromagnetic poles for the multiple pole brushless DC compressor motor. Compressor blade 5, which is of conventional structure, fits within a compression cavity 30. The blade is attached to the left end of shaft 34, allowing the shaft to turn the blade.

By rotation of shaft 34, compressor blade 5 rotates and draws air into the compressor and compresses that air in the compression cavity 30, raising the enthalpy of the air, both in pressure and temperature. That high enthalpy air exits the chamber at pipe 38 and via a conduit flows into the heat exchanger, as was illustrated in FIG. 1.

Expansion turbine and generator 7 contains field windings 39 defining a multiple electromagnetic pole winding arrangement, an armature 41, suitably formed of circumferentially spaced permanent magnet poles, attached to shaft 34, and a turbine blade 9. The housing defines a standard expansion chamber 40 for compressed high enthalpy air, outputted from heat exchanger 16 in FIG. 1, that is admitted through pipe 42. The expanding air drives the turbine blade as hereafter described. Following expansion the expanded air, previously cooled in heat exchanger 16 (FIG. 1) and further by expansion through turbine blade 9 exits from the unit.

Electromagnetic field windings 39, attached to turbine blade 9, are rotatably supported in the housing by annular bearings 44 and 45. The bearings allow the field windings to rotate relative to the housing, and, further, relative to shaft 34 as well.

The field windings support a set of electrical slip rings 46 for joint rotation with the field windings. The slip rings provides electrical continuity between the electrical leads to the field windings, that rotates with the field windings, and the external electrical leads 48, which are stationary. Leads 48 are coupled to the controller of FIG. 1. Turbine blade 9 is also coupled to and supported by a side of field windings 39, suitably by an axially extended tubular bracket portion 47. That coupling permits the two elements to rotate together. The turbine blade thereby rotates generator field windings 39 about the axis of shaft 34, independently of that shaft.

A bearing 37 is fitted axially within turbine blade 9 and mechanically couples the turbine blade over shaft 34. That bearing minimizes rotational friction between shaft and turbine and does not interfere with independent relative rotation between those two elements. Thus shaft 34 is free to rotate at a different speed than the turbine blade 9 as the two are not rotationally coupled together, unlike the prior commercial air cooling systems.

Lateral motion of the free end of the shaft 34, located at the right end in the figure, is restrained indirectly by the housing walls through bearing 37, turbine blade 9, connecting element 47, the field winding 39 and bearings 44 and 45, the latter of which are attached to the housing wall.

Shaft rotation sensors, 6 and 8, symbolically illustrated, respectively monitor the position and speed of rotation of each of shaft 34 and turbine 9 and provide that information to controller 11 in FIG. 1. Reading that information the controller is aware of the speed of each and of the instantaneous position of each rotary element. By controlling the DC current phasing to the compressor's electric motor, the controller can increase or decrease it's speed and can maintain a predetermined speed differential between the compressor and the turbine.

As earlier herein described, expansion turbine 9 is rotated by the expanding cooling air that enters the expansion chamber 40 and exits the front end of blade 9. That air is routed to the cabin as described in the schematic of FIG. 1. Shaft 34 rotates at the speed determined by the air compressor's electric motor, which is controlled by controller 11. In practice, the two elements are rotating at different speeds and a speed differential exists.

Rotation of the field windings 39, carried by turbine 9, relative to armature 41 induces voltages in the field windings. Those voltages are AC voltages. The frequency of that AC voltage is dependent on the differential rotational speed; the higher the speed, the higher the frequency. Since the compressor operates on DC, and the aircraft's power supply is AC, controller 11 contains a suitable full wave or bridge rectifier, not illustrated. The AC generated by the generator's field windings 39 is thus rectified and used to add charge to that provided by the aircraft's power supply and from there is distributed to the compressors motor. Controller 11 includes an additional rectifier to process the AC electrical energy that is output from the turbine driven generator and combine it with the DC energy supplied by the rectified aircraft system power to drive the air compressor motor.

The torque generated by the generator field winding against the armature 41 mounted to shaft 34 is also supplied mechanically to the compressor. In this manner, the voltage in the generator windings is relatively low for a corresponding current in the windings, and a good portion of the power transfer is via the magnetic torque coupling to shaft 34. This produces a very efficient processing of the power delivered from the turbine to the compressor. It should be understood that in this embodiment of the invention, turbine wheel 9 and the generator always turn at substantially greater speed and in the same relative direction to housing 25 than does the compressor.

Controller 11 can then manage the generator to operate on the free wheeling air expansion driven turbine 9, directing the turbine to rotate at a greater or lesser relative speed to the air compressor by regulating the current through field windings 41. The relative speed of the generator to the compressor, creates a rotational torque on armature 41 that helps the compressor motor to turn shaft 34.

For example, at a given flow rate, the cooling rate depends on the difference in operating speed between the compressor and turbine. The less the difference, the greater the pressure "squeezed" between the compressor and the tubine and the higher the interstage air temperature. A higher temperature permits a greater heat transfer rate at the ram-air heat exchanger, and cooler air will thus be delivered to the cabin from the expansion turbine. This operation can be worked in reverse to some extent, that is, reducing the pressure and increasing the relative speed of the turbine to the compressor results in less power extraction and greater outlet air temperature.

It is recognized that at some point, depending on the outside ram air temperature and pressure, the air would eventually become cooler or the cabin pressure could fall too low if this reverse operation is extended too far. Because of that, an alternate temperature adjustment arrangement is provided. The system of FIG. 1 includes ram air flow valve 10. This valve controls the ram air flow rate. In turn that flow rate controls the heat rejection obtained from the ram air heat exchanger, and, indirectly thereby, the output temperature from the machine. Those skilled in the art recognize that a variable inlet nozzle, not illustrated, may be located approximately at the inlet 42 to turbine chamber 40 for improved operation. Such a variable inlet nozzle would be of a design that complements the variable speed operation of the turbine.

Power electronics technology permits the rapid switching of electrical power circuits in such a manner that the motors driving the air compressor and turbine are accurately controlled in both speed and torque in all four quadrants, that is delivering torque both in the direction of motion and in the opposite direction of motion in both rotational directions. And the programmed digital computer is capable of controlling that power electronics.

It is seen that independent but coordinated control of the main air conditioning components, such as compressor, ram air heat exchanger air flow, expansion turbine and cabin air outflow valve, provides a greatly simplified cabin air conditioning system, one that contains an increased number of options for control of the air conditioning parameters, than available with present commercial systems.

Any suitable digital computer may be used for the controller 11 with appropriate ancillary solid state switching electronics to interface with the other cooling system elements. The controller contains the appropriate manually operated on-off switches to allow the pilot to start air conditioning, the standard temperature and humidity selectors, the temperature sensors to automatically monitor cabin air temperature and humidity, and a program with the algorithms to assess all sensors and to respond, as necessary, to have the controller adjust the air compressor, extract or input current to the motor generator, adjust plenum 10 and cabin outflow valve, as best produces the most efficient cooling system operation.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An air cycle air cooling machine for an aircraft, said aircraft containing a source of electricity, comprising: an electrically powered air compressor for raising the pressure and temperature of air to produce high enthalpy air, cooling means for cooling said high enthalpy air to lower the temperature thereof, and a turbine driven electrical generator for producing electrical voltage, said turbine driven electrical generator including a rotatably mounted turbine blade, said blade being driven in rotation by expansion of said cooled pressurized air; said turbine driven electrical generator containing an armature and field windings; said armature being mounted for rotation by said electrical air compressor means and said field windings being mounted for rotation with said turbine blade, whereby the electrical voltage produced by said turbine driven electrical generator is dependent upon the relative rotational velocity between said armature and said field windings.

2. The invention as defined in claim 1 further comprising: control means; said control means including circuit means for withdrawing electrical current from said electrical generator field windings, whereby electrical power is withdrawn through said field windings, said control means further including means for returning at least a portion of electrical power produced by said turbine driven electrical generator to said source of electricity.

3. The invention as defined in claim 1 further comprising: control means; said control means including programmed digital computer means; electronic switch means and sensor means;

said sensor means for sensing the rotational speed of said motor, and for sensing the rotational speed and angular position of said generator field winding, and for sensing the voltage generated in said generator field windings.

4. The invention as defined in claim 1, wherein said electrically powered compressor means and said turbine driven electrical generator comprise a unitary assembly, said unitary assembly including:

a shaft supported for axial rotation in said assembly, said shaft extending the length of said assembly;

electric air compressor means;

said electric air compressor means including:

a compressor blade and an air compression chamber with said blade disposed in said chamber and being connected to said shaft for rotation by said shaft;

said air compression chamber having an air inlet and an air outlet;

said compressor blade being located at a first end of said housing for drawing air into said inlet and compressing said air for expression through said outlet responsive to rotation of said compression blade;

electric motor means;

said electric motor means including field windings and an armature, said armature being mounted to said shaft, wherein said shaft rotates in response to electrical current being supplied to said field windings;

generator means; said generator means including generator field windings;

bearing means for mounting said field windings for rotation within said assembly about said shaft;

a generator armature;

said generator armature containing permanent magnet means;

said generator armature being mounted for rotation by said shaft, whereby relative rotation between said armature and said winding induces electrical voltage in said field windings and, alternatively, whereby excitation current introduced into said field windings produces a torque on said armature;

an expansion turbine blade and an air expansion chamber with said turbine blade disposed in said air expansion chamber;

said air expansion chamber having an air inlet and an air outlet; said expansion turbine blade being located at a second end of said assembly for receiving compressed air at said inlet and expressing expanded air through said outlet, said air expanding to create a rotational force on said expansion turbine blade and lower the temperature of said air;

bearing means disposed coaxially within said expansion turbine blade and over said shaft for permitting relative rotation between said expansion turbine blade and said shaft;

connecting means connecting said expansion turbine blade to said field winding means for joint rotation about said shaft;

stationary electric leads, said stationary electric leads being mounted in a stationary position;

slip ring means connected to said field windings for coupling electric currents between said rotatable field windings and said stationary electric leads;

whereby rotation of said turbine blade rotates said generator field windings and said electric air compressor rotates said shaft to rotate said generator armature to produce a voltage in said generator field winding that is a function of the relative rotational velocity between said generator field winding and said generator armature and, alternativley, whereby excitation current introduced from said stationary electric leads into said field windings produces a torque on said armature.

5. The invention as defined in claim 4, wherein said control means further includes: full wave rectifier means for converting AC applied to an input to DC at an output; means for connecting said full wave rectifier means output to said source of electricity; and for connecting the output of said electrical generator field winding to said full wave rectifier means input.

6. The invention as defined in claim 4, wherein said electrically powered compressor means and said turbine driven electrical generator comprise a unitary assembly, said unitary assembly including:

a shaft supported for axial rotation in said assembly, said shaft extending the length of said assembly;

electric air compressor means;

said electric air compressor means including:
a compressor blade and an air compression chamber with said blade disposed in said chamber and being connected to said shaft for rotation by said shaft; said air compression chamber having an air inlet and an air outlet; said compressor blade being located at a first end of said housing for drawing air into said inlet and compressing said air for expression through said outlet responsive to rotation of said compression blade;

an electric motor means;
said electric motor means including field windings and an armature, said armature being mounted to said shaft, wherein said shaft rotates in response to electrical current being supplied to said field windings;

generator means; said generator means including generator field windings;

bearing means for mounting said field windings for rotation within said assembly about said shaft;

a generator armature;
said generator armature containing permanent magnet means;
said generator armature being mounted for rotation by said shaft, whereby relative rotation between said armature and said winding induces electrical voltage in said field windings and, alternatively, whereby excitation current introduced into said field windings produces a torque on said armature;

an expansion turbine blade and an air expansion chamber with said turbine blade disposed in said air expansion chamber;

said air expansion chamber having an air inlet and an air outlet; said expansion turbine blade being located at a second end of said assembly for receiving compressed air at said inlet and expressing expanded air through said outlet, said air expanding to create a rotational force on said expansion turbine blade and lower the temperature of said air;

bearing means disposed coaxially within said expansion turbine blade and over said shaft for permitting relative rotation between said expansion turbine blade and said shaft;

connecting means connecting said expansion turbine blade to said field winding means for joint rotation about said shaft;

stationary electric leads, said stationary electric leads being mounted in a stationary position;

slip ring means connected to said field windings for coupling electric currents between said rotatable field windings and said stationary electric leads;

whereby rotation of said turbine blade rotates said generator field windings and said electric air compressor rotates said shaft to rotate said generator armature to produce a voltage in said generator field winding that is a function of the relative rotational velocity between said generator field winding and said generator armature and, alternativley, whereby excitation current introduced from said stationary electric leads into said field windings produces a torque on said armature.

7. The invention as defined in claim 4, further comprising an aircraft, said aircraft containing a passenger cabin; and wherein said air cycle air cooling machine is disposed in said aircraft at a location other than said cabin;

cabin air outflow valve means for permitting a portion of air within said cabin to exit to the exterior of said aircraft;

ram air duct means for supplying ram air from the exterior of said aircraft to said air compressor and to said cooling means;

duct means for coupling cooled air exhausted from said turbine blade to said passinger cabin; and wherein said control means further comprises:
digital controller means, including digital processor means and program means, for controlling each of said air compressor, said ram air duct means, said duct means, said cooling means, said electrical generator means, and said cabin air outflow valve means.

8. In a unitary assembly, the combination comprising:

a shaft supported for axial rotation in said assembly, said shaft extending the length of said assembly;

electric air compressor means;

said electric air compressor means including:
a compressor blade and an air compression chamber with said blade disposed in said chamber and being connected to said shaft for rotation by said shaft; said air compression chamber having an air inlet and an air outlet; said compressor blade being located at a first end of said housing for drawing air into said inlet and compressing said air for expression through said outlet responsive to rotation of said compression blade;

an electric motor means;
said electric motor means including field windings and an armature, said armature being mounted to said shaft, wherein said shaft rotates in response to electrical current being supplied to said field windings;

generator means; said generator means including generator field windings;

bearing means for mounting said field windings for rotation within said assembly about said shaft;

a generator armature, said generator armature containing permanent magnet means;
said generator armature being mounted for rotation by said shaft, whereby relative rotation between said armature and said winding induces electrical voltage in said field windings and, alternatively, whereby excitation current introduced into said field windings produces a torque on said armature;

an expansion turbine blade and an air expansion chamber with said turbine blade disposed in said air expansion chamber;

said air expansion chamber having an air inlet and an air outlet; said expansion turbine blade being located at a second end of said assembly for receiving compressed air at said inlet and expressing expanded air through said outlet, said air expanding to create a rotational force on said expansion turbine blade and lower the temperature of said air;

bearing means disposed coaxially within said expansion turbine blade and over said shaft for permitting relative rotation between said expansion turbine blade and said shaft;

connecting means connecting said expansion turbine blade to said field winding means for joint rotation about said shaft;

stationary electric leads, said stationary electric leads being mounted in a stationary position;

slip ring means connected to said field windings for coupling electric currents between said rotatable field windings and said stationary electric leads;

whereby rotation of said turbine blade rotates said generator field windings and said electric air compressor rotates said shaft to rotate said generator armature to produce a voltage in said generator field winding that is a function of the relative rotational velocity between said generator field winding and said generator armature and, alternativley, whereby excitation current introduced from said stationary electric leads into said field windings produces a torque on said armature.

9. In a unitary assembly, the combination comprising:

a shaft supported for axial rotation in said assembly, said shaft extending the length of said assembly;

electric air compressor means;

said electric air compressor means including:

a compressor blade and an air compression chamber with said blade disposed in said chamber and being connected to said shaft for rotation by said shaft; said air compression chamber having an air inlet and an air outlet; said compressor blade being located at a first end of said housing for drawing air into said inlet and compressing said air for expression through said outlet responsive to rotation of said compression blade;

an electric motor means;

said electric motor means including field windings and an armature, said armature being mounted to said shaft, wherein said shaft rotates in response to electrical current being supplied to said field windings;

generator means; said generator means including generator field windings;

bearing means for mounting said field windings for rotation within said assembly about said shaft;

a generator armature;

said generator armature being mounted for rotation by said shaft, whereby relative rotation between said armature and said winding induces electrical voltage in said field windings;

an expansion turbine blade and an air expansion chamber with said turbine blade disposed in said air expansion chamber;

said air expansion chamber having an air inlet and an air outlet; said expansion turbine blade being located at a second end of said assembly for receiving compressed air at said inlet and expressing expanded air through said outlet, said air expanding to create a rotational force on said expansion turbine blade and lower the temperature of said air;

bearing means disposed coaxially within said expansion turbine blade and over said shaft for permitting relative rotation between said expansion turbine blade and said shaft;

connecting means connecting said expansion turbine blade to said field winding means for joint rotation about said shaft;

slip ring means connected to said field windings for coupling electric currents between said rotatable field windings and stationary electric leads;

whereby rotation of said turbine blade rotates said generator field windings and said electric air compressor rotates said shaft to rotate said generator armature to produce a voltage in said generator field winding that is a function of the relative rotational velocity between said generator field winding and said generator armature.

10. In an aircraft, said aircraft containing a source of electricity and a passenger cabin, an air cycle air cooling machine for said aircraft, comprising: an electrically powered air compressor for raising the pressure and temperature of air to produce high enthalpy air, cooling means for cooling said high enthalpy air to lower the temperature thereof, and a turbine driven electrical generator for producing electrical voltage, said turbine driven electrical generator including a rotatably mounted turbine blade, said blade being driven in rotation by expansion of said cooled pressurized air; said turbine driven electrical generator containing an armature and field windings; said armature being mounted for rotation by said electrical air compressor means and said field windings being mounted for rotation with said turbine blade, whereby the electrical voltage produced by said turbine driven electrical generator is dependent upon the relative rotational velocity between said armature and said field windings; and wherein said air cycle air cooling machine is disposed in said aircraft at a location therein other than said cabin;

cabin air outflow valve means for permitting a portion of air within said cabin to exit to the exterior of said air craft;

ram air duct means for supplying ram air from the exterior of said aircraft to said air compressor and to said cooling means;

duct means for coupling cooled air exhausted from said turbine blade to said passinger cabin; and digital controller means, including digital processor means and program means, for controlling each of said air compressor, said ram air duct means, said duct means, said cooling means, said electrical generator means, and said cabin air outflow valve means.

* * * * *